(12) United States Patent
Miyauchi et al.

(10) Patent No.: US 7,484,201 B2
(45) Date of Patent: Jan. 27, 2009

(54) NONLINEAR EDITING WHILE FREELY SELECTING INFORMATION SPECIFIC TO A CLIP OR A TRACK

(75) Inventors: Hideaki Miyauchi, Tokyo (JP); Hideyuki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 10/201,207

(22) Filed: Jul. 22, 2002

(65) Prior Publication Data

US 2003/0030661 A1 Feb. 13, 2003

(30) Foreign Application Priority Data

Jul. 23, 2001 (JP) .............................. 2001-221161

(51) Int. Cl.
G06F 9/44 (2006.01)
G06F 3/00 (2006.01)

(52) U.S. Cl. ...................... 717/113; 717/110; 717/111; 717/112; 715/723

(58) Field of Classification Search ..................... 713/1; 715/723, 202; 345/600–700; 707/104.1–501, 707/1; 714/4; 717/110–113, 164–169; 386/52
See application file for complete search history.

(56) References Cited

U.S. PATENT DOCUMENTS

| | | | |
|---|---|---|---|
| 5,404,316 A | | 4/1995 | Klingler et al. |
| 5,613,122 A | * | 3/1997 | Burnard et al. ................. 713/1 |
| 5,682,326 A | | 10/1997 | Klingler et al. |
| 5,729,741 A | * | 3/1998 | Liaguno et al. ........... 707/104.1 |
| 6,157,929 A | * | 12/2000 | Zamiska et al. .............. 707/200 |
| 6,204,840 B1 | * | 3/2001 | Petelycky et al. ............ 715/202 |
| RE37,722 E | * | 5/2002 | Burnard et al. ................. 713/1 |
| 6,633,309 B2 | * | 10/2003 | Lau et al. ..................... 715/723 |
| 6,636,869 B1 | * | 10/2003 | Reber et al. .............. 707/104.1 |
| 6,671,818 B1 | * | 12/2003 | Mikurak ......................... 714/4 |
| 2001/0036356 A1 | * | 11/2001 | Weaver et al. ................. 386/52 |
| 2002/0023103 A1 | * | 2/2002 | Gagne ...................... 707/501.1 |
| 2003/0004983 A1 | * | 1/2003 | Cohen ........................ 707/500 |
| 2003/0018609 A1 | * | 1/2003 | Phillips et al. ................. 707/1 |
| 2003/0052906 A1 | * | 3/2003 | Lau et al. ..................... 345/700 |
| 2003/0197710 A1 | * | 10/2003 | Gonsalves et al. .......... 345/600 |

FOREIGN PATENT DOCUMENTS

| | | |
|---|---|---|
| EP | 0 526 064 | 2/1993 |
| EP | 0 843 311 | 5/1998 |
| EP | 0 863 510 | 9/1998 |
| EP | 0 920 014 | 6/1999 |

* cited by examiner

*Primary Examiner*—Lewis A. Bullock, Jr.
*Assistant Examiner*—Insun Kang
(74) *Attorney, Agent, or Firm*—Frommer Lawrence & Haug LLP; William S. Frommer; Ellen Marcie Emas

(57) ABSTRACT

A nonlinear editing method for performing editing by displaying an editing window having a area for displaying a track on a display device and disposing a clip representing a selected material on the track, the nonlinear editing method including: having a first object for representing an editing parameter specific to the clip and a second object for representing an editing parameter specific to the track on which the clip is disposed; and performing editing while selectively operating the first object and the second object.

5 Claims, 8 Drawing Sheets

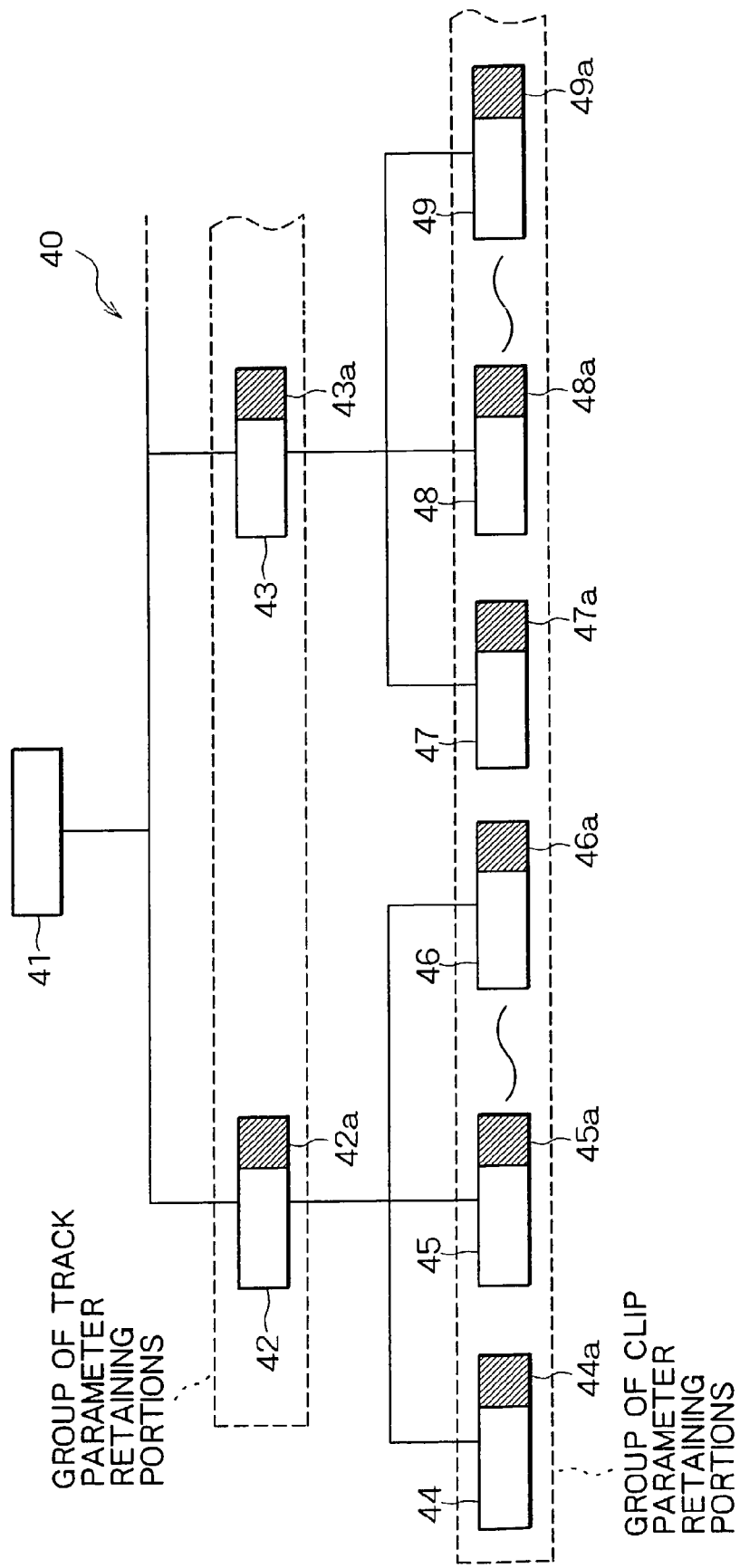

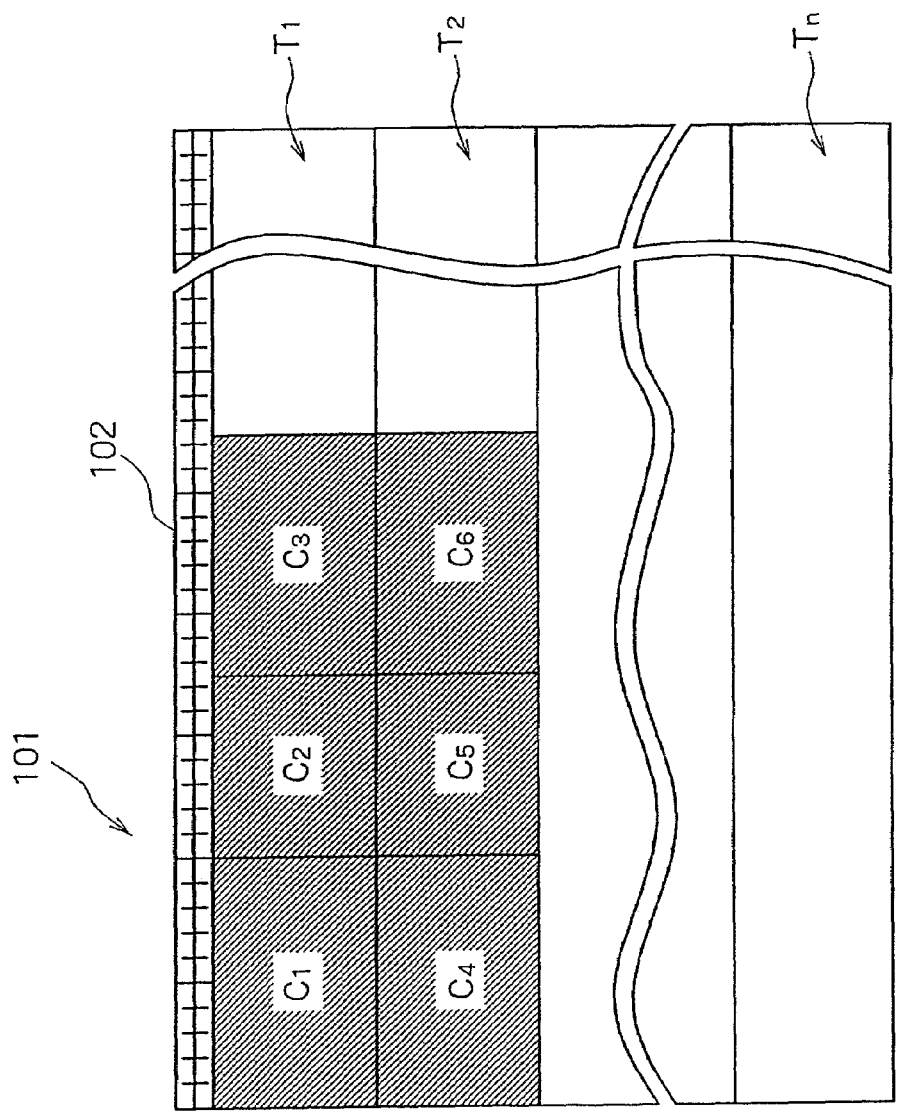

NONLINEAR EDITING WHILE FREELY SELECTING INFORMATION SPECIFIC TO A CLIP OR A TRACK

BACKGROUND OF THE INVENTION

The present invention relates to a nonlinear editing method, a nonlinear editing apparatus, a program, and a recording medium storing the program, and particularly to a nonlinear editing method, a nonlinear editing apparatus, a program, and a recording medium storing the program that enable intuitive editing operation using a graphical user interface displayed on a display device.

Nonlinear editing refers to creation of desired moving-image contents (broadcasting video contents for a broadcasting program or the like and video contents for personal use) by appropriately selecting a moving-image material and an audio material or materials including both a moving-image material and an audio material (hereinafter referred to simply as "material") stored on a hard disk, joining the materials together, and giving the materials various rendering effects.

Because of advantages of nonlinear editing such as being capable of finer editing by a frame unit as compared with conventional linear editing using a magnetic tape medium, nonlinear editing has become popular not only for business use of broadcasting stations, postproduction and the like but also now for personal use at school, home and the like against a background of the spread of high-performance personal computers and digital video cameras and the spread of nonlinear editing packaged software that is easy to use and operates on the personal computers.

MediaStudio Pro (trademark), for example, is known as nonlinear editing packaged software that operates on a general-purpose personal computer (hereinafter referred to simply as "nonlinear editing software"). The software includes an editing tool referred to as VideoEditor, which displays a graphical editing window on a screen of the personal computer and thus provides an editing environment with excellent intuitive operability.

FIG. 7 is a diagram showing a part of the editing window (particularly a track editing area). The track editing area 101 is formed by a plurality of (n in FIG. 7) tracks T1 to Tn having an axis of abscissas as a time line 102. A user arranges, on the tracks T1 to Tn, graphic objects referred to as "clips" indicating materials (source files) selected on the basis of intended editing, and thereby performs nonlinear editing.

In the example shown in FIG. 7, a clip C1, a clip C2, and a clip C3 are arranged in that order from the left on the first track T1, and a clip C4, a clip C5, and a clip C6 are arranged in that order from the left on the second track T2. Supposing for convenience that the first track T1 is a video track and the second track T2 is an audio track, the clip C1, the clip C2, and the clip C3 arranged on the track T1 each represent a video material, and the clip C4, the clip C5, and the clip C6 arranged on the second track T2 each represent an audio material.

Thus, in this case, it is possible to obtain a combined output (nonlinear editing output) of a video material (the clip C1, the clip C2, and the clip C3) and an audio material (the clip C4, the clip C5, and the clip C6) sequentially reproducible along the time line 102.

Such nonlinear editing requires various editing operations such as rearranging materials, changing length of a material, changing audio level and the like. Taking the editing window shown in FIG. 7 as an example, the rearranging of materials can be performed by changing positions of the clips C1 to C6. The changing of the length of materials can be performed by changing length of the clips C1 to C6 (length in a horizontal direction of the graphic objects). These editing operations are so devised that the editing operations can be performed intuitively by using a pointing device such as a mouse or the like. Specifically, a clip can be moved by dragging and dropping the entire clip, and the length of a clip can be changed by dragging a left edge or a right edge of the clip.

On an audio track, audio level adjustment for matching levels of two adjacent clips with each other, removing undesired sound and the like is required.

FIG. 8A is a diagram showing one audio clip (clip C4 for convenience) disposed on an arbitrary audio track (track T2 for convenience). A line object 103 for display of audio level, which object indicates 0% at a lower edge of the clip C4 and 100% at an upper edge of the clip C4, is displayed on the clip C4. Both ends of the line object 103 are provided with control point objects 104 and 105 of a given shape (small square in the figure).

The control point objects 104 and 105 can be moved (dragged) in a vertical direction independently. When the control point objects 104 and 105 are dragged in an upward direction (direction of 100%), the audio level is increased, whereas when the control point objects 104 and 105 are dragged in a downward direction (direction of 0%), the audio level is decreased. The line object 103 changes a gradient of a straight line thereof according to the movement (drag) of the control point objects 104 and 105, thereby making it possible to intuitively perceive change of the audio level on the time axis in a visualized form.

FIG. 8B illustrates a first example of control of the audio level. In this example, a new control point object 106 is added to the line object 103, and the position of the control point object 105 situated at the right edge of the clip C4 is lowered to substantially 0%. According to this example, the audio level during reproduction of the clip C4 is maintained at substantially 50% in a range from the control point object 104 to the control point object 106, and is linearly decreased to substantially 0% in a range from the control point object 106 to the control point object 105.

Such audio level control (first example) is used for smooth connection to a subsequent audio clip in the case of a BGM (background music) sound source, for example.

FIG. 8C illustrates a second example of control of the audio level. In this example, new control point objects 107, 108, and 109 are added to the line object 103, and the position of the control point object 108 is lowered to substantially 0%. According to this example, the audio level during reproduction of the clip C4 is maintained at substantially 50% in a range from the control point object 104 to the control point object 107, linearly decreased to substantially 0% in a range from the control point object 107 to the control point object 108, linearly increased to substantially 50% in a range from the control point object 108 to the control point object 109, and maintained at substantially 50% in a range from the control point object 109 to the control point object 105.

Such audio level control (second example) is used when sound unnecessary for reproduction such for example as noise or the like is included in a specific portion (around the control point object 108 in the example shown in FIG. 8C) of the clip C4, for example.

The conventional nonlinear editing software described above is so devised that an editing parameter defined on an arbitrary clip, or an editing parameter such for example as the audio level or the like is stored as information specific to the clip integrally with the clip. When the clip is changed for another clip, for example, an editing parameter of the clip after the change is reset to an initial value.

(1) Such a device has the following problem inherent therein. When the same editing parameter is desired to be applied to the clip after the change, the operation of setting the same editing parameter needs to be repeated, which takes time and trouble.

A case where "the same editing parameter is desired to be applied to the clip after the change" is a case such for example as the foregoing first example. In the first example, the audio level after the control point object 106 is linearly decreased. This operation is a so-called fade-out operation. A fade-out is often used for smooth connection between clips of BGM sound sources and the like. Even when an arbitrary BGM clip is changed for another BGM clip, a fade-out is not removed in general.

(2) A method conceivable for solving the above problem is for example setting an editing parameter not as information specific to a clip but as information specific to a track where the clip is situated. This method does not cause the above problem because the editing parameter remains on the track as it is even when the clip is changed.

However, with this method, when the same editing parameter is desired not to be applied to the clip after the change, for example when another clip without noise is substituted in the audio level control effected to remove noise as in the foregoing second example, the editing parameter for removing noise is of course not needed. Therefore, another operation of resetting the editing parameter to an initial value is required, which again takes time and trouble.

SUMMARY OF THE INVENTION

It is accordingly an object of the present invention to make it possible to freely select information specific to a clip or information specific to a track where the clip is situated to be the editing parameter of the clip and to thus eliminate the need for the operation of resetting the editing parameter or the operation of initializing the editing parameter and thereby improve operability.

In order to achieve the above object, according to the present invention, there is provided a nonlinear editing method for performing editing by displaying an editing window having a area for displaying a track on a display device and disposing a clip representing a selected material on the track, the nonlinear editing method including: having a first object for representing an editing parameter specific to the clip and a second object for representing an editing parameter specific to the track on which the clip is disposed; and performing editing while selectively operating the first object and the second object.

According to the present invention, the editing parameter specific to the clip is operated when the first object is selected and the editing parameter specific to the track is operated when the second object is selected.

BRIEF DESCRIPTION OF THE DRAWINGS

FIG. 3 is a schematic structural diagram of a project file 40;

FIG. 7 is a diagram showing a part of a conventional editing window (particularly a track editing area)

DETAILED DESCRIPTION OF PREFERRED EMBODIMENTS

Preferred embodiments of the present invention will hereinafter be described with reference to the drawings. It is to be noted that various specified details, examples, numerical values, character strings, and other symbols in the following description are cited only for reference to clarify concepts of the present invention, and it is therefore clear that the concepts of the present invention are not limited by all or part of them. Also, description of details of known methods, known processes, known architecture, known circuit configurations and the like (hereinafter referred to as "known matters") will be omitted to simplify the following description, and not to intentionally exclude all or part of the known matters. Such known matters are known to those skilled in the art at the time of application of the present invention, and thus are of course included in the following description.

Figure 1A:
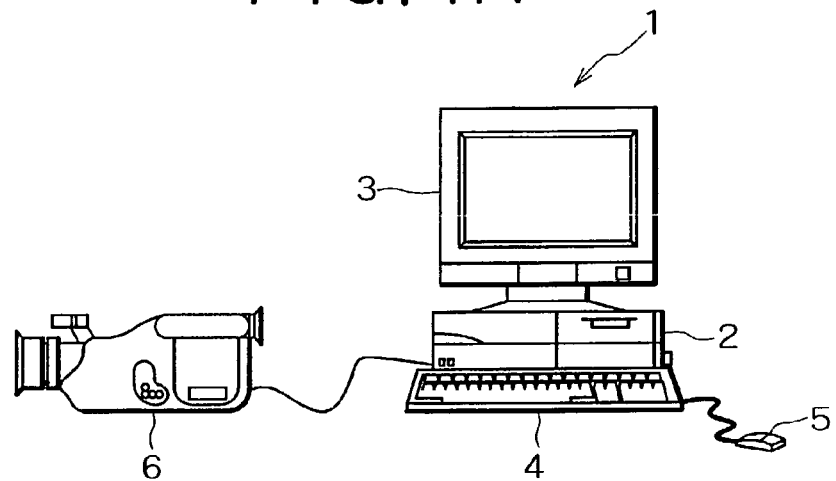
FIGS. 1A and 1B are an external view of a personal computer and a conceptual diagram of hardware configuration of the personal computer.
Figure 1B:
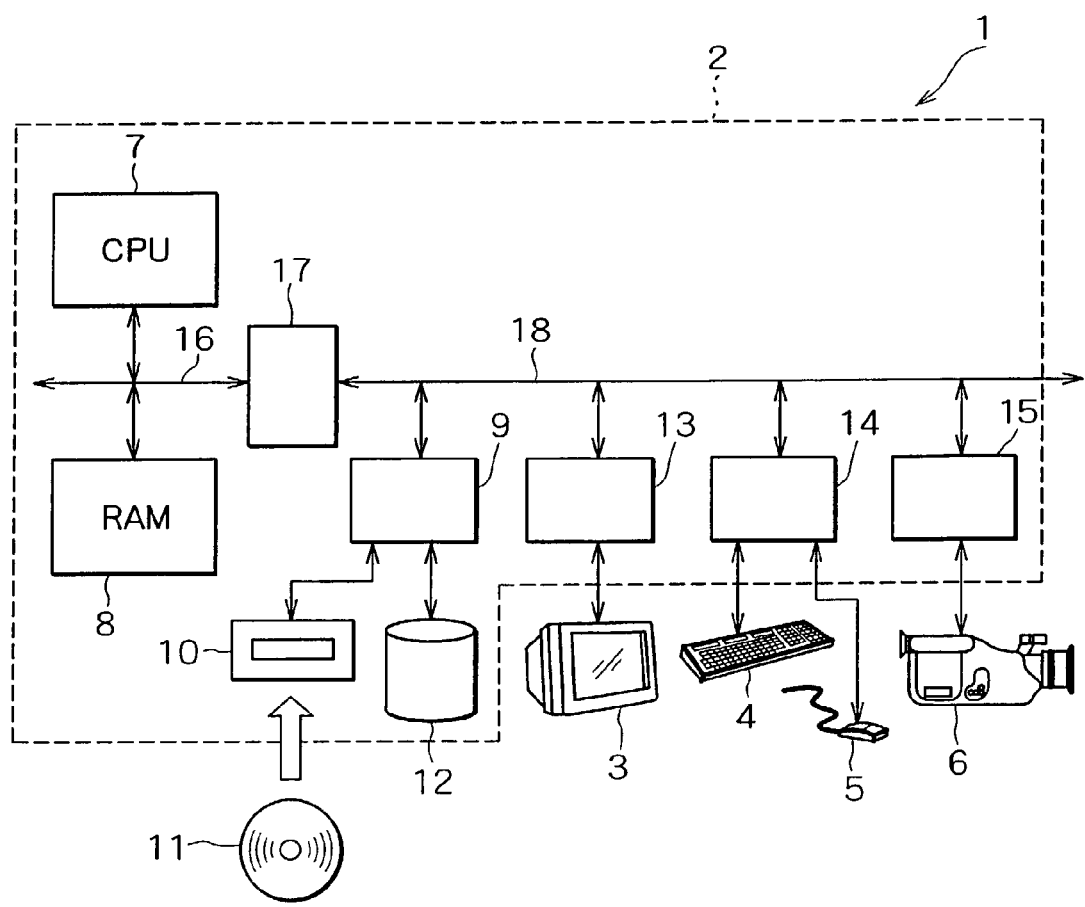

FIGS. 1A and 1B are an external view of a personal computer and a conceptual diagram of hardware configuration of the personal computer. A personal computer (hereinafter abbreviated to a "PC") 1 is a general-purpose product configured by known architecture (such as DOS/V architecture or the like). The figures illustrate the so-called desktop type PC 1 whose main unit 2 is connected with a display device 3, a keyboard 4, a pointing device (mouse in the figures) 5, a digital video camera 6 and the like. However, the present invention is not limited to this. The PC 1 may be a notebook type PC, a tower type PC or the like. It is to be noted that the name ("personal computer" or "PC") of the PC 1 has no special meaning, and is merely a generic name. The PC 1 may be called otherwise, for example a "workstation," an "office computer," a "minicomputer," an "information processing apparatus" or the like.

Although the PC 1 may be somewhat different in configuration in terms of scale, stability and the like depending on the model, there is no significant difference in the fundamental configuration (architecture) of the so-called "computer." For example, the PC 1 shown in the figures includes, in the main unit 2, a CPU 7, a RAM 8, a disk controller 9, a CD-RW drive 10, a hard disk 12, a display controller 13, a keyboard controller 14, a digital video board 15, a main bus 16, a bus interface 17, an internal bus 18 and the like. The PC 1 also has the display device 3, the keyboard 4, the pointing device 5 and the like external to the main unit 2. As required, the digital video camera 6 can be connected to the digital video board 15 of the main unit 2.

The digital video camera 6 can take a picture of an arbitrary subject and generate digital moving image data of the picture. The digital video camera 6 is provided especially with a digital input-output interface (for example an IEEE 1394 interface) compatible with the digital video board 15. It is to be noted that the digital video camera 6 in the present embodiment plays a role only in providing material necessary for nonlinear editing (source files), and in this respect, the digital video camera 6 does not necessarily need to be a "camera"; the digital video camera 6 may be a digital VTR (video tape recorder), for example.

The CD-RW drive 10 is used to record digital video contents created by nonlinear editing on a write-once type (CD-R/DVD-R) or rewritable type (CD-RW/DVD-RW) optical disk 11 and thereby store or distribute the digital video contents. However, when the digital video contents are not to be stored for a long period of time or not to be distributed, that is, when the digital video contents are reproduced only for entertainment on the PC 1, the CD-RW drive 10 is not an essential component. Alternatively, when magnetic tape is used as a medium for storage and distribution, the CD-RW drive 10 is not an essential component, because the digital video camera 6 or the digital VTR can be used as a recording device.

As is well known, the PC 1 loads an operating system preinstalled on the hard disk 12 and various application programs (hereinafter referred to generically as "software resources") into the RAM 8 for execution by the CPU 7, whereby the PC 1 realizes various processing functions by an organic combination of hardware resources such as the CPU 7 and the software resources.

One of the processing functions is a "nonlinear editing" function performed by the PC 1 alone (on a stand-alone basis). The nonlinear editing function will be described in detail in the following.

Figure 2A:
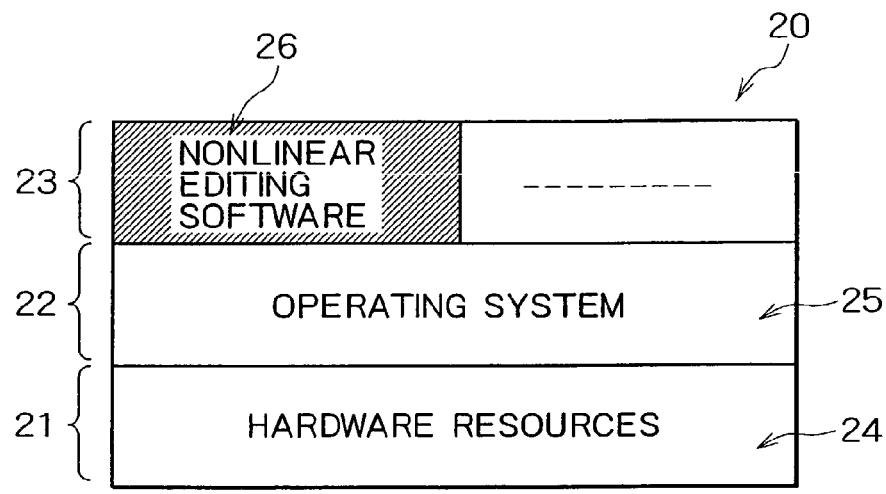
FIGS. 2A and 2B are a diagram showing a simple hierarchical model of hardware resources and software resources of the personal computer 1 and a conceptual diagram of a nonlinear editing function in an embodiment.

FIG. 2A is a diagram showing a simple hierarchical model of the hardware resources and the software resources of the PC 1. The hierarchical model 20 follows the OSI (abbreviation of Open Systems Interconnection) reference model. The hierarchical model 20 has a structure in which an operating system layer 22 and an application layer 23 are stacked on a hardware resource layer 21.

The hardware resource layer 21 includes hardware resources 24 such as the CPU 7 and the like (configuration of the main unit 2 in FIG. 1B). The hardware resource layer 21 can be used indirectly from the application layer 23 via an operating system 25 included in the operating system layer 22 on the hardware resource layer 21. The application layer 23 includes at least predetermined application program software (hereinafter referred to as "nonlinear editing software") 26 forming a main part of the nonlinear editing function. The nonlinear editing function in the present embodiment is realized by an organic combination of the software resources (operating system 25 and nonlinear editing software 26) and the hardware resources 24.

Figure 2B:
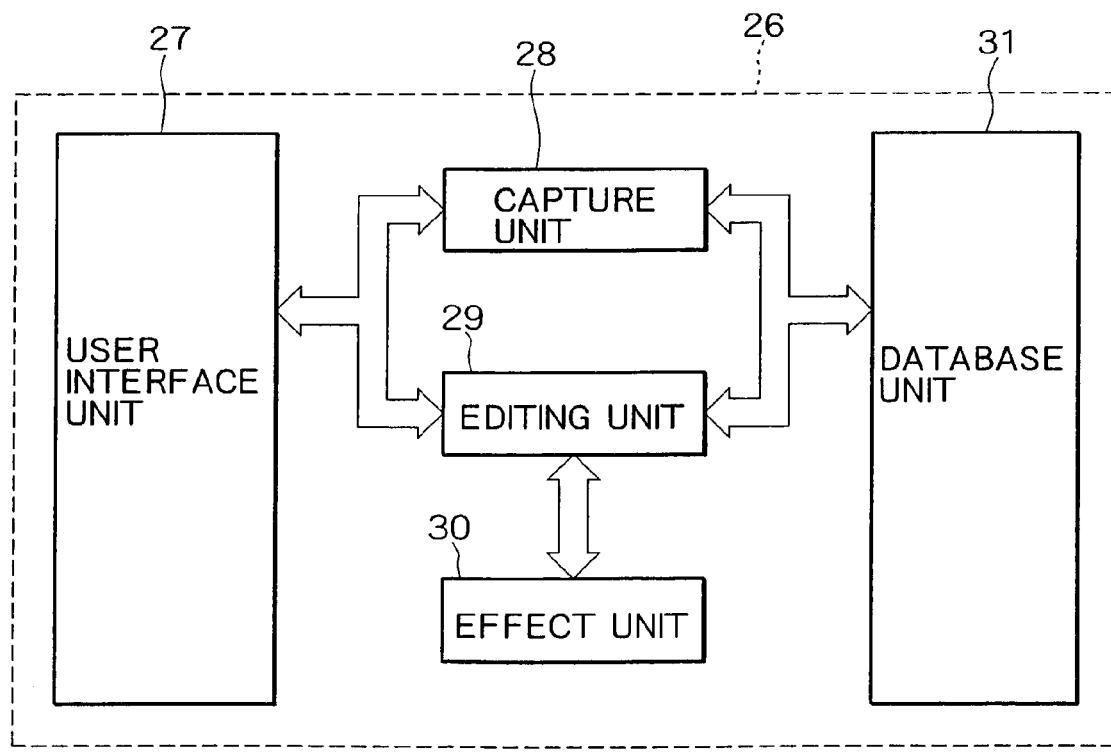

FIG. 2B is a conceptual diagram of the nonlinear editing function in the present embodiment. A user interface unit (display control means) 27, a capture unit 28, an editing unit (operation control means) 29, an effect unit 30 and a database unit 31 in the figure correspond to the nonlinear editing software 26 in FIG. 2A.

The user interface unit 27 outputs various graphical user interfaces (GUIs) to display resources of the hardware resources 24 (that is, the display controller 13 and the display device 3). A user creates desired digital video contents by selectively using the capture unit 28, the editing unit 29, and the effect unit 30 while interacting with the GUIs.

The capture unit 28 is in charge of processing of reading image data from the digital video camera 6, capturing a desired portion (scene or the like) of the image data and creating material (source file), and storing the material (source file) on the hard disk 12. The editing unit 29 is in charge of processing of selecting materials stored on the hard disk 12, joining the materials together, giving the materials special effects or the like, and thereby creating digital video contents. The effect unit 30 is in charge of processing of giving digital video contents various special effects required. The database unit 31 manages information (referred to as a project file) on the creation of digital video contents. The entity of a project file is present on the hard disk 12. During the creation of digital video contents, a copy of the entity is made in the RAM 8 and the database unit 31 manages the copy. At the time of completion of the creation or at the time of an end of the creation still in progress, the copy is written back to the hard disk 12 to update the project file. A final product (for example an MPEG file or the like) of the digital video contents is created on the basis of the project file.

FIG. 3 is a schematic structural diagram of a project file. The project file 40 has a hierarchical structure provided with a file information portion 41 in an upper layer, track information portions 42 and 43 in a middle layer, and clip information portions 44 to 49 in a lower layer. In the example shown in the figure, the file information portion 41 in the uppermost layer has the first track information portion 42 and the second track information portion 43 under the file information portion 41. The first track information portion 42 has three clip information portions 44 to 46 under the first track information portion 42 and the second track information portion 43 has three clip information portions 47 to 49 under the second track information portion 43. Thus, in this example, the first track information portion 42 controls the three clip information portions 44 to 46, the second track information portion 43 controls the three clip information portions 47 to 49, and the file information portion 41 in the uppermost layer controls the first and second track information portions 42 and 43. Incidentally, one file information portion (file information portion 41 in the figure) is provided in the uppermost layer per project file in all cases, and one or a plurality of track information portions and one or a plurality of clip information portions are provided per project file.

The file information portion 41 stores information specific to the project file 40 (such as the name of the project file, the name of the creator, the date of file creation, the date of file update, file size and the like). The track information portions 42 and 43 each store information specific to the track, such for example as editing track type (video track type or audio track type), track number, track length, IN point/OUT point and the like. The clip information portions 44 to 49 each store information specific to the clip, such for example as information on where a material (source file) associated with the clip is stored, clip number, clip length, IN point/OUT point and the like.

The present embodiment is characterized in that all the track information portions 42 and 43 and all the clip information portions 44 to 49 in the project file 40 having the above structure are provided with editing parameter retaining portions (portions shown hatched for convenience) 42a to 49a. Track editing parameter retaining portions 42a and 43a of the editing parameter retaining portions 42a to 49a store editing parameters of the corresponding tracks, while clip editing parameter retaining portions 44a to 49a of the editing parameter retaining portions 42a to 49a store editing parameters of the corresponding clips.

The editing parameters to be stored are for example audio level setting editing parameters, or more specifically, data on change in audio level along a time axis (time line), and are, in short, audio level set values in each frame. The track editing parameter retaining portions 42a and 43a are identical with the clip editing parameter retaining portions 44a to 49a in that the track editing parameter retaining portions 42a and 43a and the clip editing parameter retaining portions 44a to 49a both retain such editing parameters (audio setting editing parameters), and the track editing parameter retaining portions 42a and 43a are different from the clip editing parameter retaining portions 44a to 49a in the time axis. Specifically, the track editing parameter retaining portions 42a and 43a are different from the clip editing parameter retaining portions 44a to 49a in that the track editing parameter retaining portions 42a and 43a retain the editing parameter in correspondence with a time axis having a start position (IN point) or the like of the corresponding "track" as a reference point (00:00:00:00) (hour:minute:second:frame) whereas the clip editing parameter retaining portions 44a to 49a retain the editing parameter in correspondence with a time axis having a start position (IN point) or the like of the corresponding "clip" as a reference point (00:00:00:00)(same as above).

For example, when the track editing parameter retaining portion 42a stores data indicating that audio level is set to x % at a certain point in time (for example 00:01:01:01), the data indicates that the audio level is set to x % at a first frame 0 hours, 1 minute, 1 second from the reference point of the corresponding "track." If the same data is retained by the clip editing parameter retaining portion 44a, the data indicates a point after the lapse from the reference point of the corresponding "clip." Thus, the data retained by the track editing parameter retaining portion 42a and the data retained by the clip editing parameter retaining portion 44a indicate different times.

Figure 4A:
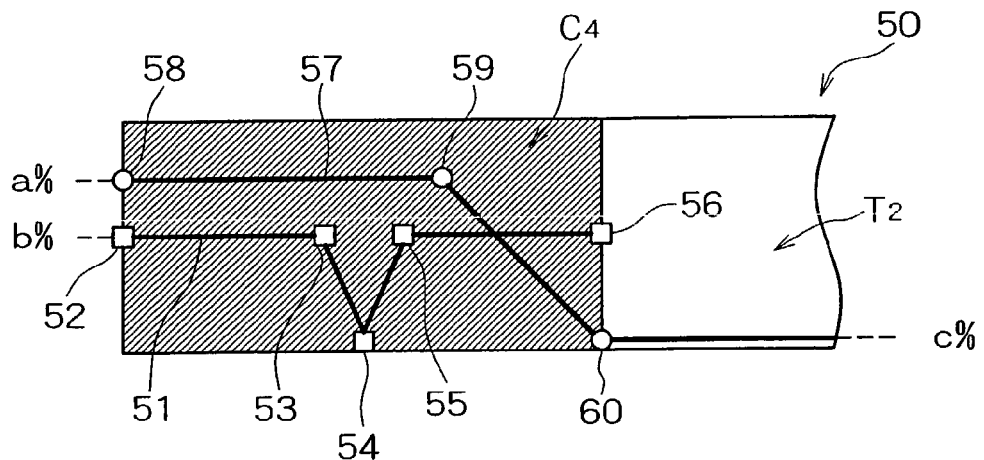
FIGS. 4A, 4B, and 4C are diagrams showing GUIs (editing windows) of the present embodiment.
Figure 4B:
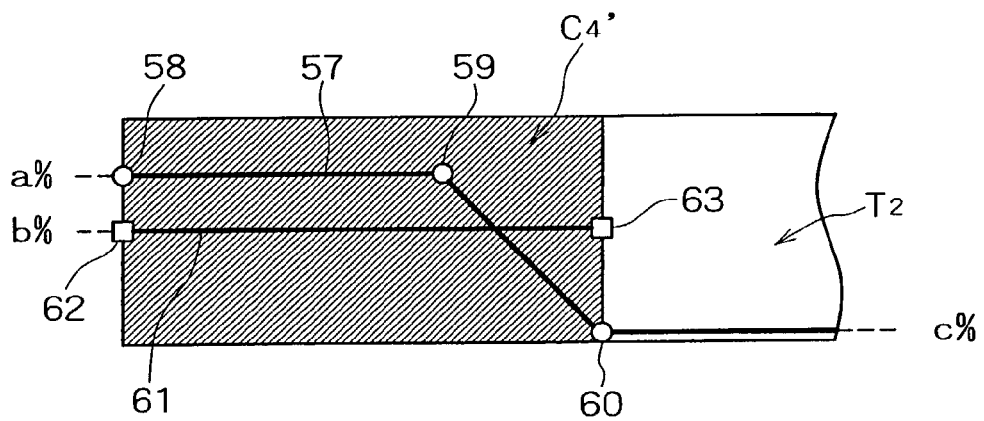
Figure 4C:
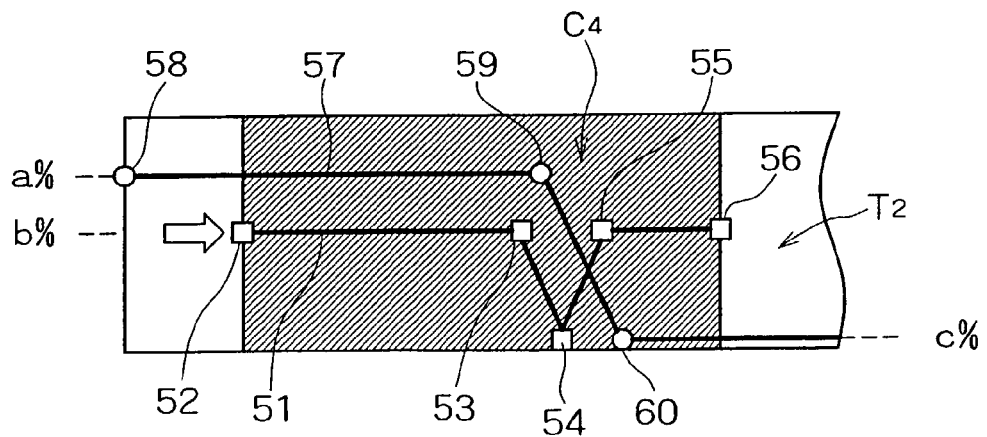
Figure 8A:
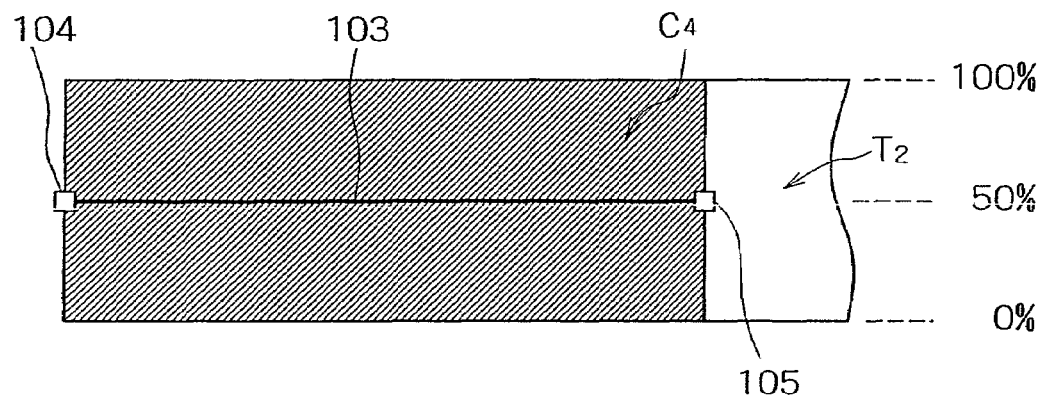
FIGS. 8A, 8B, and 8C are diagrams showing one audio clip (clip C4 for convenience) disposed on an arbitrary audio track (track T2 for convenience).
Figure 8B:
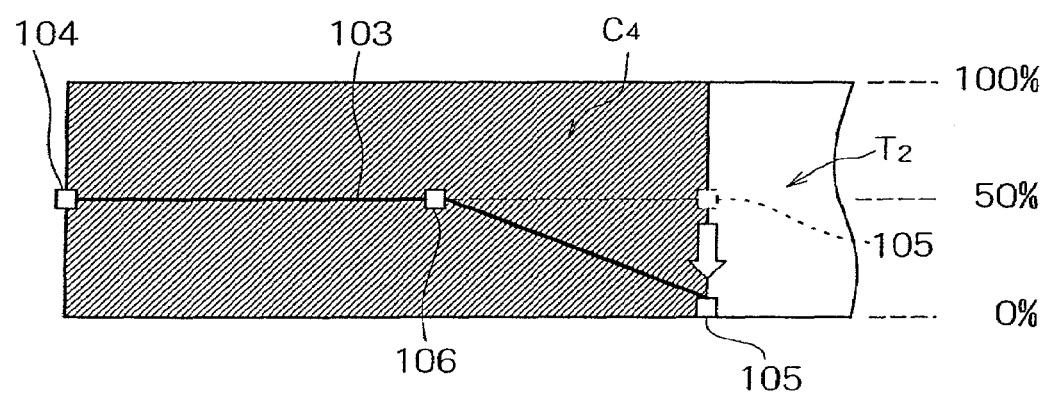
Figure 8C:
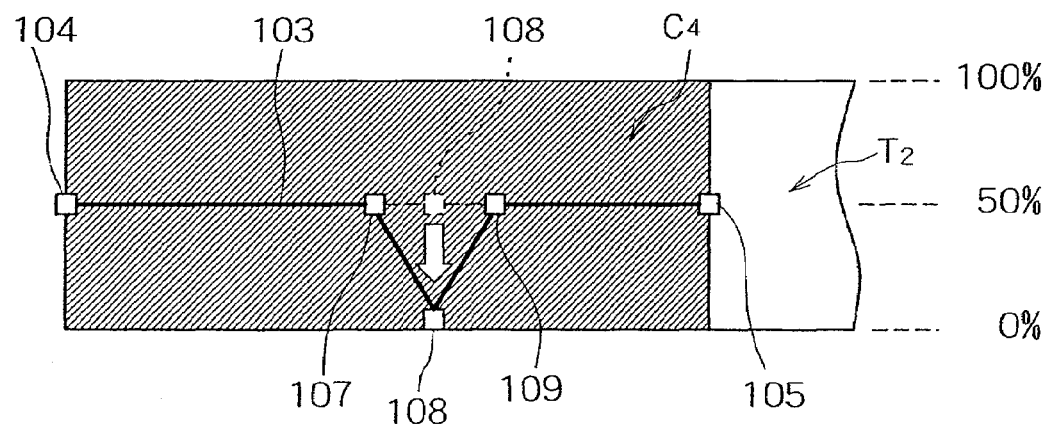

FIGS. 4A, 4B, and 4C are diagrams showing GUIs (editing windows) of the present embodiment. The GUI 50 show a portion corresponding to the track T2 in the foregoing conventional technique (see FIGS. 8A, 8B, and 8C). In the figures, a clip C4 is pasted on the track T2, and the clip C4 has a line object (first object) 51 disposed thereon and control point objects (first objects) 52 to 56 situated on the line object 51. The line object 51 and the control point objects 52 to 56 represent the set value of the audio editing parameter of the clip C4. For example, the line object 51 and the control point objects 52 to 56 in the example of FIG. 4A indicate that the audio level in a range from the control point object 52 to the control point object 53 is maintained at b %; the audio level in a range from the control point object 53 to the control point object 54 is linearly decreased from b % to c %; the audio level in a range from the control point object 54 to the control point object 55 is linearly increased from c % to b %; and the audio level in a range from the control point object 55 to the control point object 56 is maintained at b%.

In this example, a line object (second object) 57 and control point objects (second objects) 58 to 60 situated on the line object 57 are also disposed on the track T2. The line object 57 and the control point objects 58 to 60 represent the set value of the audio editing parameter of the track T2. For example, the line object 57 and the control point objects 58 to 60 in the example of FIG. 4A indicate that the audio level in a range from the control point object 58 to the control point object 59 is maintained at a %; and the audio level in a range from the control point object 59 to the control point object 60 is linearly decreased from a % to c %.

Of the two object sets (that is, the set of the line object 51 and the control point objects 52 to 56 and the set of the line object 57 and the control point objects 58 to 60), the former is specific to the clip C4 and the latter is specific to the track T2. The object sets are generated by reference to the clip editing parameter storing portion 44a to 49a and the track editing parameter storing portion 42a or 43a of the project file 40 described above.

Specifically, the line object 51 and the control point objects 52 to 56 specific to the clip C4 are generated by reference to data stored in one of the clip editing parameter storing portions 44a to 49a (editing parameter storing portion corresponding to the clip C4). The line object 57 and the control point objects 58 to 60 specific to the track T2 are generated by reference to data stored in one of the track editing parameter storing portions 42a and 43a (editing parameter storing portion corresponding to the track T2).

Thus, according to the present embodiment, the line object (57 in FIG. 4A) and the control point objects (58 to 60 in FIG. 4A) specific to the track can be displayed on the GUI 50, and also the line object (51 in FIG. 4A) and the control point objects (52 to 56 in FIG. 4A) specific to the clip can be displayed on the GUI 50. When the clip C4 is deleted and a new clip C4' is inserted in that position, as shown in FIG. 4B, for example, an initialized line object (first object) 61 and initialized control point objects (first objects) 62 and 63 are newly displayed on the inserted clip C4'. Therefore, it is not necessary to reset the set value of the audio level. Furthermore, in this case, when a fade-out is needed in the clip position, the set values (fade-out) of the line object 57 and the control point objects 58 to 60 set as information specific to the track T2 as shown in FIG. 4B can be used as they are, regardless of whether the clip C4 is deleted or not, and thus the clip can be changed freely.

As shown in FIG. 4C, when the clip C4 is moved and the clip C4 includes noise or the like, the line object 51 and the control point objects 52 to 56 as shown in the figure are set on the clip C4, whereby reproduction of the noise or the like can be prevented and the reproduction preventing effect is not lost even after the movement of the clip C4.

Thus, according to the present embodiment, the structure of the project file 40 is devised to allow not only an editing parameter specific to a clip but also an editing parameter specific to a track to be stored. In addition, an object set specific to the clip (set of a line object and control point objects) and an object set specific to the track are generated on the basis of the stored information. Therefore, the following especially beneficial effects can be obtained:

(1) In a case where a clip is deleted to insert a new clip, or where clips are changed, when the same editing parameter is desired to be applied to the inserted clip or the clip after the change (the first example mentioned above, for example), the desire can be readily met by using the object set for the track and operation for setting the same editing parameter again does not need to be repeated.

(2) When the same editing parameter is desired not to be applied to the inserted clip or the clip after the change (the second example mentioned above, for example), the desire can be readily met by using objects for the clip and operation for resetting the same editing parameter is not required.

It is to be noted that concepts of the present invention are not limited to the above embodiment. The present invention includes various modifications within the intended scope of the invention, and may for example include the following modifications.

First Modification

Figure 5A:
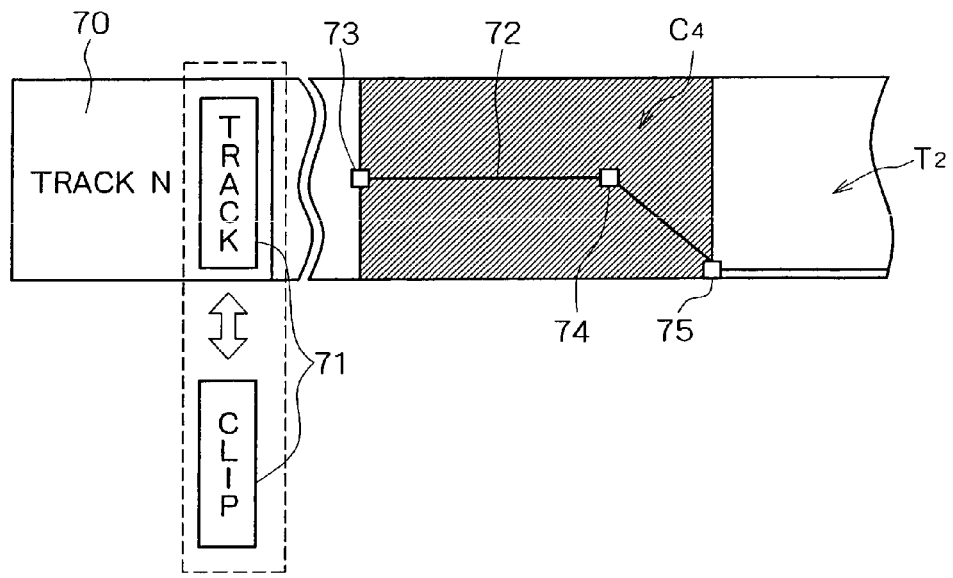
FIGS. 5A, 5B, and 5C are diagrams showing a first modification of the present embodiment.

FIG. 5A is a diagram showing a first modification of the present embodiment. In FIG. 5A, a command button object 71 is disposed in a title displaying area 70 of a track T2. The command button object 71 is a so-called toggle button, and title display is changed to "track" or "clip" each time the command button object 71 is clicked. A line object (first object or second object) 72 and control point objects (first objects or second objects) 73 to 75 disposed on the line object 72, which objects represent the set value of audio level, are displayed on a clip C4 pasted on the track T2.

When the title display of the command button object 71 is changed to "clip," the line object 72 and the control point objects 73 to 75 are specific to the clip C4. On the other hand, when the title display of the command button object 71 is changed to "track," the line object 72 and the control point objects 73 to 75 are specific to the track T2.

Figure 5B:
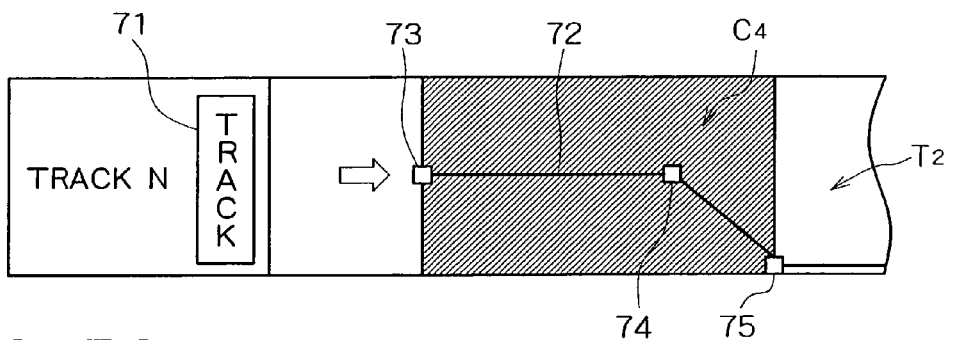

Thus, according to the first modification, when the title display of the command button object 71 is changed to "clip," the line object 72 and the control point objects 73 to 75 are specific to the clip C4. Therefore, when the clip C4 is moved as shown in FIG. 5B, for example, the line object 72 and the control point objects 73 to 75 are moved together with the clip C4, so that the audio level does not need to be set again at a position after the movement of the clip C4.

Figure 5C:
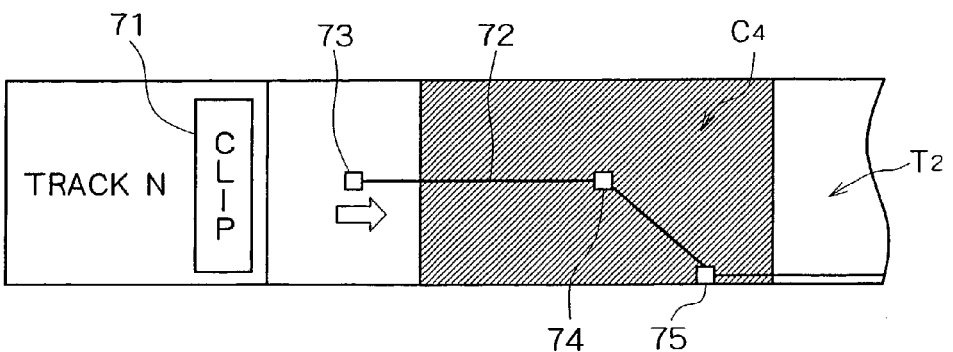

According to the first modification, when the title display of the command button object 71 is changed to "track," the line object 72 and the control point objects 73 to 75 are specific to the track T2. Therefore, even when the clip C4 is moved as shown in FIG. 5C, for example, the line object 72 and the control point objects 73 to 75 stay in the original position, so that the setting of the audio level of the whole track is not changed.

Second Modification

Figure 6A:
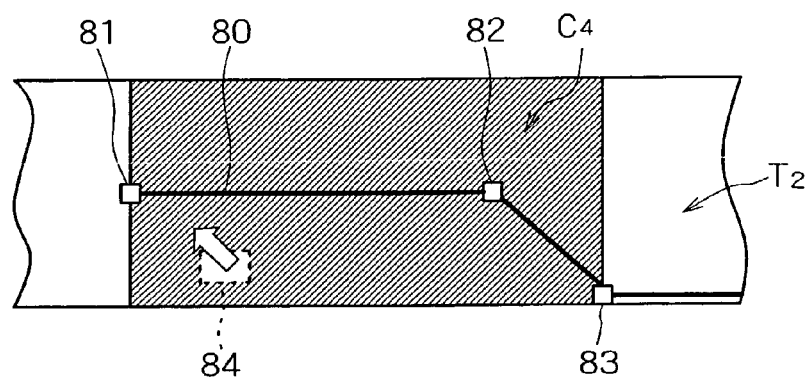
FIGS. 6A, 6B, and 6C are diagrams showing a second modification of the present embodiment.

FIG. 6A is a diagram showing a second modification of the present embodiment. In FIG. 6A, a line object (first object or second object) 80 and control point objects (first objects or second objects) 81 to 83 disposed on the line object 80, which objects represent the set value of audio level, are displayed on a clip C4 pasted on a track T2. The second modification is unique in that in dragging the clip C4, when the line object 80 and the control point objects 81 to 83 are specific to the clip C4, the line object 80 and the control point objects 81 to 83 are dragged together with the clip C4, whereas when the line object 80 and the control point objects 81 to 83 are specific to the track T2, only the clip C4 is dragged.

Figure 6B:
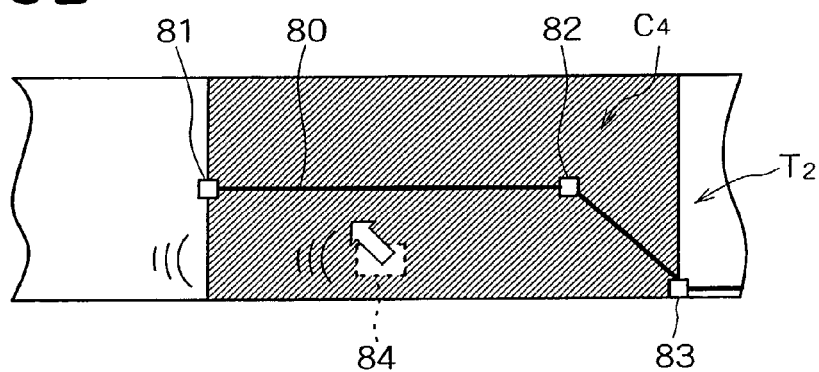
Figure 6C:
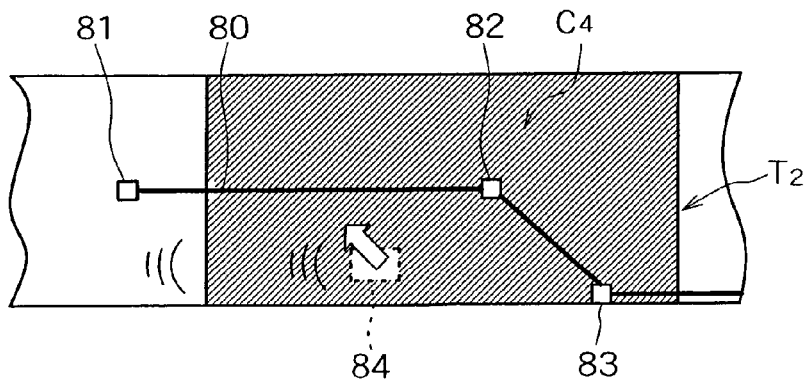

Thus, according to the second modification, when the line object 80 and the control point objects 81 to 83 are moved together with the clip C4 in accordance with movement of a drag icon 84, as shown in FIG. 6B, it is to be intuitively understood that the line object 80 and the control point objects 81 to 83 are information specific to the clip C. When the line object 80 and the control point objects 81 to 83 are not moved, as shown in FIG. 6C, it is to be intuitively understood that the line object 80 and the control point objects 81 to 83 are information specific to the track T2. As a result, it is possible to avoid erroneous operation and perform reliable editing.

It is to be noted that while the above description has been made by taking as an example a stand-alone nonlinear editing system, it is needless to say that the present invention is not limited to this. A broadcasting station or postproduction, for example, may use a nonlinear editing system on a larger scale than the stand-alone type, for example a nonlinear editing system constructed by combining one or a plurality of client terminals such as personal computers with a video server, or a nonlinear editing system constructed by including other editing apparatus in addition to the client terminal or the plurality of client terminals and the video server. The above nonlinear editing system is not different from the stand-alone type at least in that the various GUIs described above providing excellent intuitive operability (see FIGS. 4A, 4B, and 4C, FIGS. 5A, 5B, and 5C, and FIGS. 6A, 6B, and 6C) are displayed on a client terminal such as a personal computer. Accordingly, the present invention is of course applicable to such a large-scale system.

According to the present invention, when a first object is selected, an editing parameter specific to a clip is operated, and when a second object is selected, an editing parameter specific to a track is operated. Therefore, the information specific to the clip or the information specific to the track where the clip is situated can be freely selected to be the editing parameter of the clip. Thus, it is possible to eliminate the need for the operation of resetting the editing parameter or the operation of initializing the editing parameter, and to thereby improve operability.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A nonlinear editing method for performing an editing operation by disposing a clip corresponding to a source file on a track on an editing window, the method comprising the steps of:

displaying said editing window;

generating a first object and a second object in the editing window to visually display adjusting levels of editing parameters set for said source file and to set the editing parameters intuitively in a visualized form, wherein said first and second objects each include a line object and at least one control point object disposed on the line object, the line object indicating the level of the editing parameter applied to the clip based on setting a position of the control point object;

displaying said first and second objects on the clip in said editing window;

setting the first object for displaying or operating the editing parameter associated with the clip;

setting the second object for displaying or operating the editing parameter associated with the track; and performing editing while selectively operating the first object and second object;

wherein said source file permits said editing parameters to be stored and the first object and the second object are generated based on the stored parameters;

wherein said source file includes track editing parameter retaining portions to store said editing parameters of corresponding tracks and clip editing parameter retaining portions to store said editing parameters of corresponding clips; and wherein clip editing parameters and track editing parameters are independently applied during editing such that when the clip is edited on the track, the line and control point objects of the track maintain their position in the editing window independent of the position of the line and control point objects of the edited clip.

2. A nonlinear editing method for performing editing, the method comprising the steps of:

displaying an editing window having an area for displaying a track on a display device and disposing a clip corresponding to a source file representing a selected material on said track generating a first object for representing an editing parameter specific to said clip and a second object for representing an editing parameter specific to said track on which said clip is disposed, wherein said first and second objects each include a line object and at least one control point object disposed on the line object, the line object indicating the level of the editing parameter applied to the clip based on setting a position of the control point object;

displaying said first and second objects on the clip in said editing window; and performing editing while selectively operating the first object and the second object;

wherein said editing parameters are stored and the first object and the second object are generated based on the stored parameters;

wherein said source file includes track editing parameter retaining portions to store said editing parameters of corresponding tracks and clip editing parameter retaining portions to store said editing parameters of corresponding clips; and wherein clip editing parameters and track editing parameters are independently applied during editing such that when the clip is edited on the track, the line and control point objects of the track maintain their position in the editing window independent of the position of the line and control point objects of the edited clip.

3. A nonlinear editing apparatus performing editing by disposing a clip corresponding to a source file representing a selected material on a track, the apparatus comprising:

a processor;

display control means, said display control means displaying an editing window having an area for displaying the track on a display device;

said editing window having a first object for representing an editing parameter specific to said clip and a second object for representing an editing parameter specific to said track on which said clip is disposed;

said first and second objects each including a line object and at least one control point object disposed on the line object, the line object indicating the level of the editing parameter applied to the clip based on setting a position of the control point object, said first and second objects displayed on the clip in said editing window; and operation control means for selectively operating the first object and the second object;

wherein said editing parameters are stored and the first object and the second object are generated based on the stored parameters;

wherein said source file includes track editing parameter retaining portions to store said editing parameters of corresponding tracks and clip editing parameter retaining portions to store said editing parameters of corresponding clips; and wherein clip editing parameters and track editing parameters are independently applied during editing such that when the clip is edited on the track, the line and control point objects of the track maintain their position in the editing window independent of the position of the line and control point objects of the edited clip.

4. A program stored on a computer for allowing the computer to perform a predetermined processing function when executed by the computer, the program comprising:

said processing function comprising a display control function for displaying an editing window having an area for displaying a track on a display device;

a first object displayed in the editing window for representing an editing parameter specific to a clip corresponding to a source file;

a second object displayed in the editing window for representing an editing parameter specific to said track on which said clip is disposed;

wherein said first and second objects each include a line object and at least one control point object disposed on the line object, the line object indicating the level of the editing parameter applied to the clip based on setting a position of the control point object, said first and second objects displayed on the clip in said editing window; and an operation control function for selectively operating the first object and the second object;

wherein said editing parameters are stored and the first object and the second object are generated based on the stored parameters;

wherein said source file includes track editing parameter retaining portions to store said editing parameters of corresponding tracks and clip editing parameter retaining portions to store said editing parameters of corresponding clips; and wherein clip editing parameters and track editing parameters are independent applied during editing such that when the clip is edited on the track, the line and control point objects of the track maintain their position in the editing window independent of position of the line and control point objects of the edited clip.

5. A recording medium storing a program for performing an editing operation by disposing a clip corresponding to a source file on a track on an editing window, the program comprising:

a processing function comprising a display control function for displaying the editing window having an area for displaying the track on a display device;

a first object for representing an editing parameter specific to a clip corresponding to a source file displayed in the editing window;

a second object for representing an editing parameter specific to said track on which said clip is disposed displayed in the editing window;

wherein said first and second objects each include a line object and at least one control point object disposed on the line object, the line object indicating the level of the editing parameter applied to the clip based on setting a position of the control point object, said first and second objects displayed on the clip in said editing window; and an operation control function for selectively operating the first object and the second object;

wherein said editing parameters are stored and the first object and the second object are generated based on the stored parameters;

wherein said source file includes track editing parameter retaining portions to store said editing parameters of corresponding tracks and clip editing parameter retaining portions to store said editing parameters of corresponding clips; and wherein clip editing parameters and track editing parameters are independent applied during editing such that when the clip is edited on the track, the line and control point objects of the track maintain their position in the editing window independent of position of the line and control point objects of the edited clip.

* * * * *